(12) United States Patent
Saito et al.

(10) Patent No.: US 7,213,666 B2
(45) Date of Patent: May 8, 2007

(54) HYBRID VEHICLE

(75) Inventors: Osamu Saito, Saitama (JP); Tetsuya Hasebe, Saitama (JP); Yusuke Tatara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 224 days.

(21) Appl. No.: 10/660,777

(22) Filed: Sep. 12, 2003

(65) Prior Publication Data
US 2004/0050598 A1  Mar. 18, 2004

(30) Foreign Application Priority Data
Sep. 13, 2002  (JP) ................ P.2002-268399

(51) Int. Cl.
*B60K 6/04* (2006.01)
(52) U.S. Cl. .............. 180/65.2; 701/22; 701/70; 701/112; 903/941; 903/948
(58) Field of Classification Search ............ 180/65.2, 180/65.3, 65.4, 65.6, 65.7, 65.8, 69.6, 243; 701/22, 70, 112, 113; 318/139, 140; 903/903, 903/918, 925, 926, 927, 940, 941, 942, 948
See application file for complete search history.

(56) References Cited

U.S. PATENT DOCUMENTS

| | | | |
|---|---|---|---|
| 5,725,064 A * | 3/1998 | Ibaraki et al. ............ | 180/65.2 |
| 5,752,488 A * | 5/1998 | Hattori et al. ............ | 123/491 |
| 5,807,205 A | 9/1998 | Odaka et al. | |
| 6,033,041 A | 3/2000 | Koga et al. | |
| 6,283,086 B1 * | 9/2001 | Yamamoto et al. ...... | 123/198 D |
| 6,346,062 B1 * | 2/2002 | Shimabukuro et al. ......... | 477/5 |
| 6,358,182 B1 * | 3/2002 | Eguchi ................ | 477/74 |
| 6,425,365 B1 * | 7/2002 | Peters et al. .......... | 123/198 DB |
| 6,474,291 B2 * | 11/2002 | Collins et al. ........ | 123/198 DB |

(Continued)

FOREIGN PATENT DOCUMENTS

JP         10-336804         12/1998

(Continued)

OTHER PUBLICATIONS

Translation of Japanese Office Action H102188201 dated Mar. 23, 2005.

*Primary Examiner*—Christopher P. Ellis
*Assistant Examiner*—John Walters
(74) *Attorney, Agent, or Firm*—Arent Fox LLP

(57) ABSTRACT

An engine is connected to front wheels via a primary motor, a clutch and a transmission, and a secondary motor is connected to rear wheels. A vehicle is driven by the secondary motor while performing a combustion suspended idle operating condition in which the engine which has been brought to a combustion suspended condition is run idly by the primary motor according to driving conditions of the vehicle. The necessity for idling the engine is obviated so as to reduce the fuel consumption. Further, the engine can also be started up in quick and secured fashions by resuming the control of fuel supply and injection to the engine which is being run idly with its combustion being suspended and driving the primary motor while reducing the consumed power to a minimum level by reducing the load of the primary motor which runs the engine idly with its combustion being suspended.

6 Claims, 10 Drawing Sheets

U.S. PATENT DOCUMENTS

| | | |
|---|---|---|
| 6,488,107 B1 * | 12/2002 | Ochiai et al. ............... 180/65.2 |
| 6,554,736 B2 * | 4/2003 | Takano et al. .................. 477/5 |
| 6,590,299 B2 * | 7/2003 | Kuang et al. ............. 290/40 C |
| 6,638,022 B2 * | 10/2003 | Shimabukuro et al. ........ 417/2 |
| 6,886,649 B2 * | 5/2005 | Wakashiro et al. ........ 180/65.2 |
| 6,915,782 B2 * | 7/2005 | Hanada et al. ............... 123/399 |
| 6,938,606 B2 * | 9/2005 | Chung et al. ......... 123/198 DB |
| 6,947,827 B2 * | 9/2005 | Fuse et al. .................. 701/110 |
| 6,950,739 B2 * | 9/2005 | Matsubara et al. ......... 701/103 |
| 6,961,654 B2 * | 11/2005 | Boggs et al. ................ 701/112 |
| 2002/0134596 A1 * | 9/2002 | Morimoto et al. ......... 180/65.2 |
| 2006/0015244 A1 * | 1/2006 | Hawkins et al. ............ 701/112 |

FOREIGN PATENT DOCUMENTS

| | | |
|---|---|---|
| JP | 11-208297 | 8/1999 |
| JP | 2000-038939 | 2/2000 |
| JP | 2000-257453 | 9/2000 |
| JP | 2001-112114 | 4/2001 |
| JP | 3209046 | 7/2001 |
| JP | 2001-271923 | 10/2001 |
| JP | 3292224 | 3/2002 |

* cited by examiner

HYBRID VEHICLE

BACKGROUND OF THE INVENTION

1. Field of the Invention

The present invention relates to a hybrid vehicle comprising an engine which can be suspended from combustion, a primary motor and a secondary motor.

2. Description of the Related Art

A hybrid vehicle is known in JP-A-2001-112114 in which a primary motor is disposed between an engine and front wheels and a secondary motor is connected to rear wheels. In addition, known in Japanese Patent No. 3292224 and Japanese Patent No. 3209046 is a hybrid vehicle in which driving wheels can be driven by an engine and a motor, wherein an engine pumping loss reducing means is provided to reduce a load generated when the motor revolves the engine at the time of driving the driving wheels by the motor.

Incidentally, in a hybrid vehicle which is driven by a motor with an engine being stopped when a running load is light, it is possible to quickly shift from driving by the motor to driving by the engine in case the engine is started up to be brought to an idling condition in advance by detecting that the running load reaches or exceeds a predetermined value. However, in the event that the engine is started up to run idly in advance, there is caused a problem that the amount of consumed fuel is increased by such an extent. In addition, since a sum of power consumed by the running motor and power consumed to start up the engine becomes a load to be borne by a battery, there is caused another problem that a battery having a large capacity is needed.

SUMMARY OF THE INVENTION

The invention was made in view of the situations, and an object thereof is to provide a hybrid vehicle which can reduce amounts of consumed fuel and power to minimum levels while it can perform smoothly shifting from driving by the motor to driving by the engine.

With a view to attaining the object, according to a first aspect of the invention, there is proposed a hybrid vehicle comprising an engine for driving primary driving wheels via a transmission, which engine is able to be suspended from combustion, a primary motor disposed between the engine and the transmission, a secondary motor for driving one of the primary driving wheels and secondary driving wheels which are different from the primary driving wheels, and an electricity storage unit connected to the primary and secondary motors, wherein the vehicle is driven by the secondary motor while allowing the primary motor to perform a combustion suspended idle operation in which the engine which is being suspended from combustion is run idly by the primary motor according to driving conditions of the vehicle.

According to the construction, the engine, which can be suspended from combustion, is connected to the primary driving wheels via the primary motor and the transmission, and the secondary motor is connected to the secondary driving wheels. When the vehicle is in a predetermined driving condition, the vehicle can be driven by the secondary motor while allowing the primary motor to perform the combustion suspended idle operation. Therefore, the necessity for the idle operation of the engine is obviated so as to reduce the amount of consumed fuel. In addition, the engine can be started up quickly and securely with a minimum consumed power by resuming the control of fuel supply and ignition relative to the engine and driving the primary motor while reducing the load of the primary motor during the combustion suspended idle operation of the engine so as to reduce the consumed power to a minimum level.

In addition, according to a second aspect of the invention, there is proposed a hybrid vehicle as set forth in the first aspect of the invention, wherein the secondary motor is provided between the transmission and the primary driving wheels.

According to the construction, there is proposed the hybrid vehicle in which the secondary motor is provided between the transmission and the primary driving wheels in place of the secondary motor for driving the secondary driving wheels.

According to the construction, since the secondary motor is provided between the transmission and the primary driving wheels in place of the secondary motor for driving the secondary driving wheels, similar to the case where the secondary driving wheels are driven by the secondary motor, the vehicle can be driven by driving the primary driving wheels by the secondary motor while allowing the primary motor to keep the engine in the combustion suspended idle operating condition.

Additionally, according to a third aspect of the invention, there is provided a hybrid vehicle as set forth in the first or second aspect of the invention, wherein a rotational speed of the primary motor which is performing the combustion suspended idle operation is maintained at a rotational speed which can provide minimum friction on the engine.

According to the construction, the rotational speed of the primary motor which is performing the combustion suspended idle operation is maintained at the rotational speed which can provide minimum friction on the engine. Therefore, the consumed power of the primary motor performing the combustion suspended idle operation can be reduced to a minimum level.

In addition, according to a fourth aspect of the invention, there is proposed a hybrid vehicle as set forth in the first or second aspect of the invention, wherein a rotational speed of the primary motor which is performing the combustion suspended idle operation is maintained at a rotational speed at which the engine can generate a predetermined oil pressure.

According to the construction, the rotational speed of the primary motor which is performing the combustion suspended idle operation is maintained at the rotational speed at which the engine can generate the predetermined oil pressure. Therefore, the need for providing a separate electric oil pump is obviated to thereby prevent an increase in the number of components involved.

In addition, according to a fifth aspect of the invention, there is proposed a hybrid vehicle as set forth in the first or second aspect of the invention, wherein at least either an inlet valve or an exhaust valve is held closed during the combustion suspended idle operation.

According to the construction, at least either the inlet valves or the exhaust valves are held closed during the combustion suspended idle operation. Therefore, the pumping loss of the engine can be reduced to thereby reduce the power consumption of the primary motor further.

Additionally, according to a sixth aspect of the invention, there is proposed a hybrid vehicle as set forth in the first or second aspect of the invention, wherein starting up the engine from the combustion suspended idle operation is determined based on an inclination angle of a road surface and a residual capacity of the electricity storage unit.

According to the construction, whether or not the engine is started up from the combustion suspended idle operating condition is determined based on the inclination angle of the road surface and the residual capacity of the electricity storage unit. Therefore, a risk that the engine cannot be started up due to the shortage of residual capacity of the electricity storage unit can be avoided while preventing the reverse of the vehicle due to the inclined road surface.

In addition, according to a seventh aspect of the invention, there is proposed a hybrid vehicle as set forth in the six aspect of the invention, wherein the engine is started up when the inclination angle of a road surface is equal to or larger than a first set value and the residual capacity of the electricity storage unit is less than a second set value, whereby the primary motor is driven by driving force of the engine as a generator, and the secondary motor is driven by power so generated by the primary motor so as to drive the vehicle.

According to the construction, the engine is started up when the inclination angle of a road surface is equal to or larger than a first set value and the residual capacity of the electricity storage unit is less than a second set value. Therefore, the primary motor is driven by driving force of the engine as a generator, and the secondary motor is driven by power so generated by the primary motor so as to drive the vehicle. Therefore, the electricity storage unit can be charged before the engine cannot be started up due to the shortage of residual capacity of the electricity storage unit, and the secondary motor can be driven by the generated output of the engine to thereby prevent the reverse of the vehicle.

Additionally, according to an eighth aspect of the invention, there is provided a hybrid vehicle as set forth in the sixth aspect of the invention, wherein the engine is idly run with its combustion being suspended when the inclination angle of a road surface is equal to or larger than the first set value and the residual capacity of the electricity storage unit is equal to or larger than the second set value, whereby the secondary motor is driven to generate a creeping force to prevent the reverse of the vehicle.

According to the construction, the engine is idly run with its combustion being suspended when the inclination angle of a road surface is equal to or larger than the first set value and the residual capacity of the electricity storage unit is equal to or larger than the second set value. Therefore, the secondary motor is driven to generate a creeping force to prevent the reverse of the vehicle, the reverse of the vehicle can be prevented by the creeping force generated by the secondary motor while maintaining the engine in a condition in which the engine can be started up at once.

Lastly, according to a ninth aspect of the invention, there is proposed a hybrid vehicle as set forth in the eighth aspect of the invention, wherein the engine is started up when the reverse of the vehicle cannot be prevented by the creeping force generated by the secondary motor, a lock current for preventing the reverse of the vehicle being supplied to the secondary motor.

According to the construction, the engine is started up when the reverse of the vehicle cannot be prevented by the creeping force generated by the secondary motor, the lock current for preventing the reverse of the vehicle being supplied to the secondary motor. Therefore, the reverse of the vehicle can be prevented securely even when the inclination angle of the road surface is steep.

Note that a battery B in embodiments corresponds to the electricity storage unit of the invention, front wheels Wf in the embodiments correspond to the primary driving wheels, and rear wheels Wr in the embodiments correspond to the secondary driving wheels of the invention.

DETAILED DESCRIPTION OF THE INVENTION

A mode for carrying out the invention will be described below based on embodiments of the invention which are illustrated in the accompanying drawings.

Figure 1:
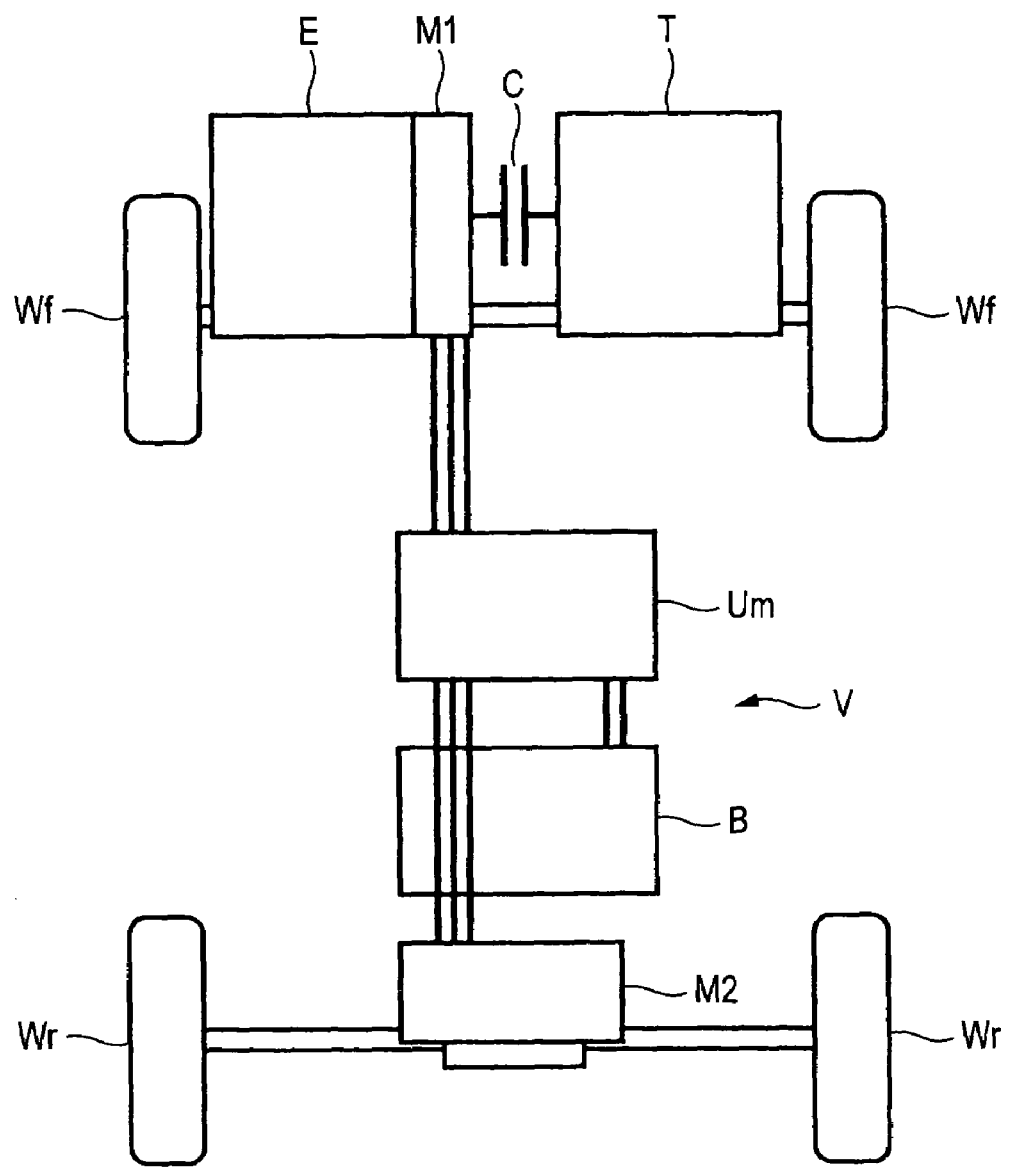
FIG. 1 is a diagram showing an overall configuration of a power train of a hybrid vehicle.
Figure 2:
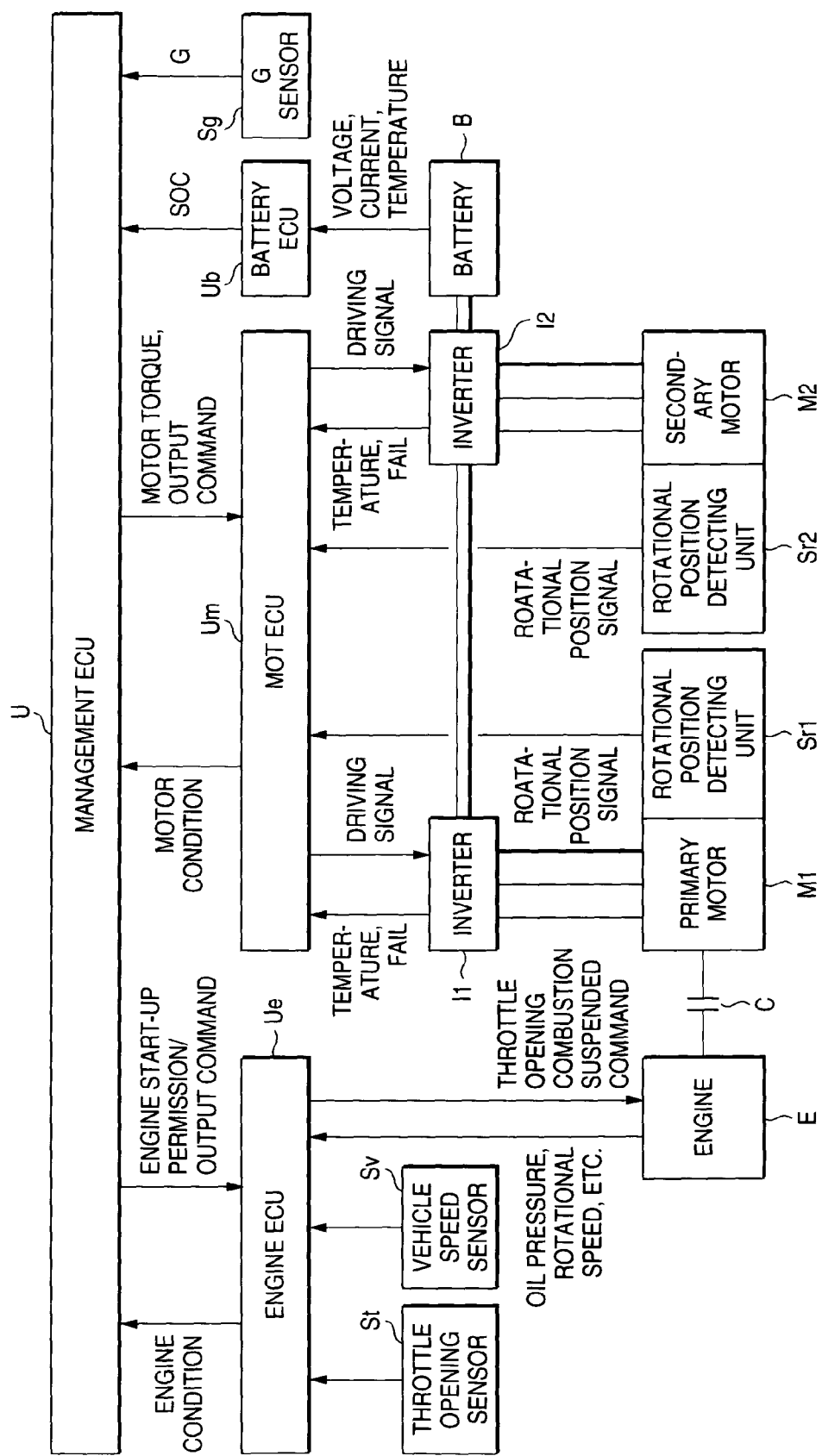
FIG. 2 is a block diagram showing a control system for the hybrid vehicle.
Figure 3:
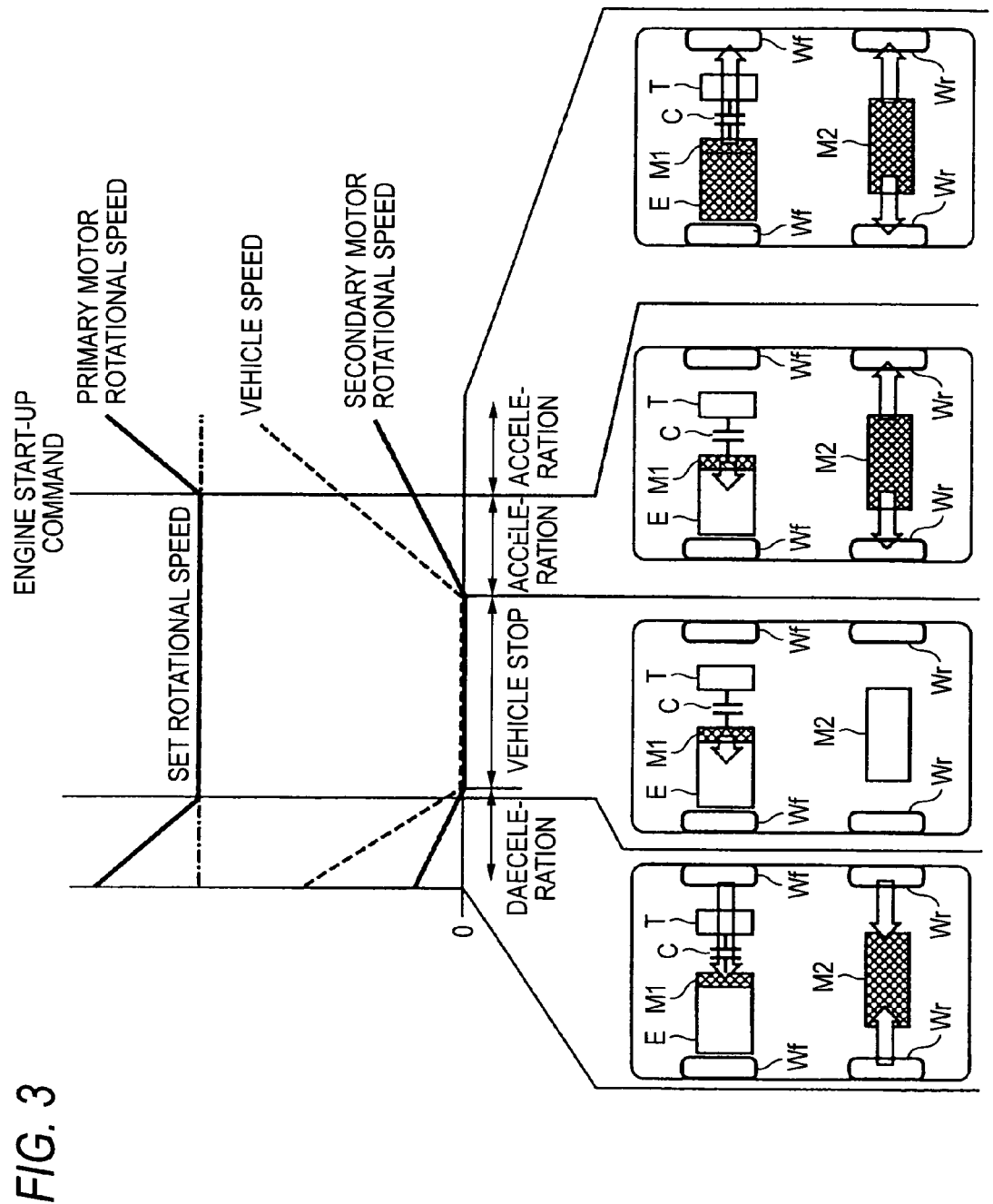
FIG. 3 is a diagram explaining an example of driving condition of the hybrid vehicle.
Figure 4:
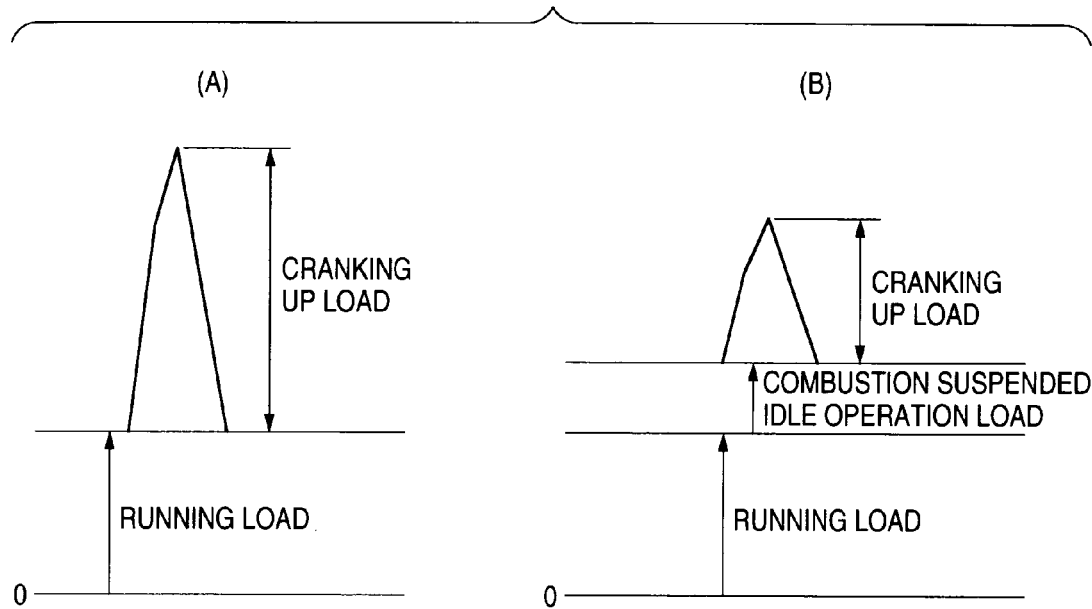
FIGS. 4A and 4B are diagrams explaining amounts of power consumed when starting up an engine.
Figure 5:
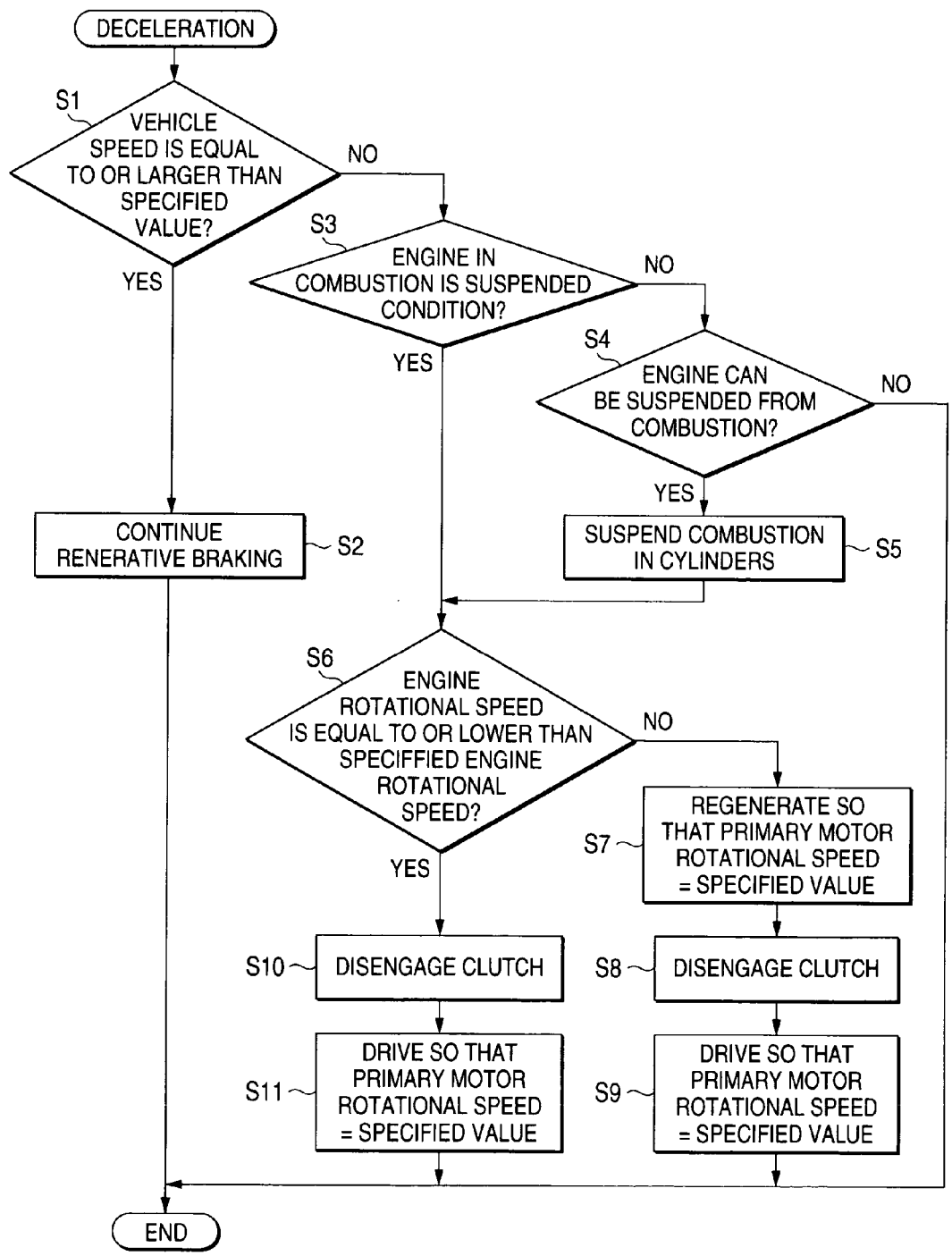
FIG. 5 is a flowchart showing a deceleration routine of the vehicle.
Figure 6:
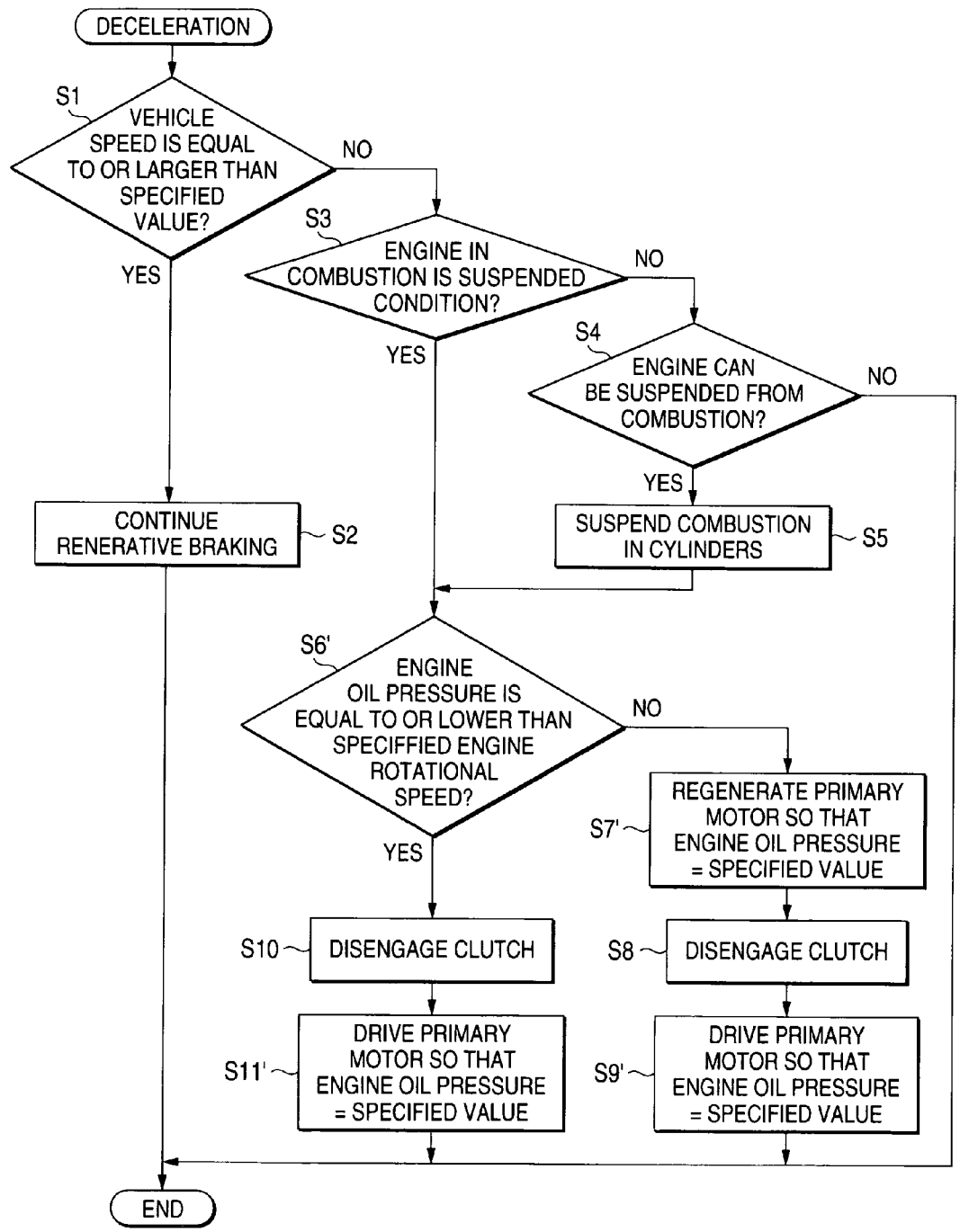
FIG. 6 is a flowchart showing another deceleration routine of the vehicle.
Figure 7:
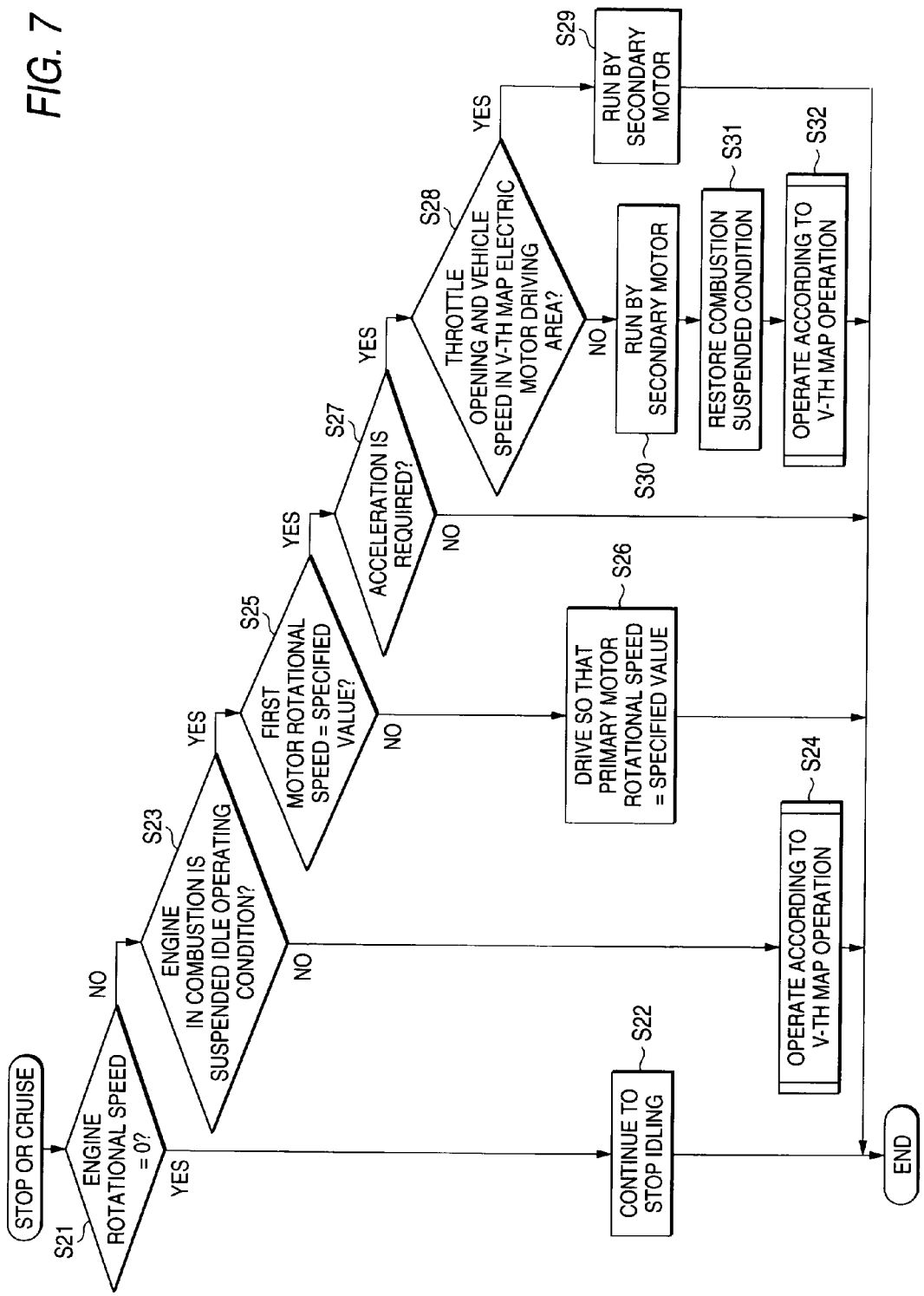
FIG. 7 is a flowchart showing a stop or cruising routine of the vehicle.
Figure 8:
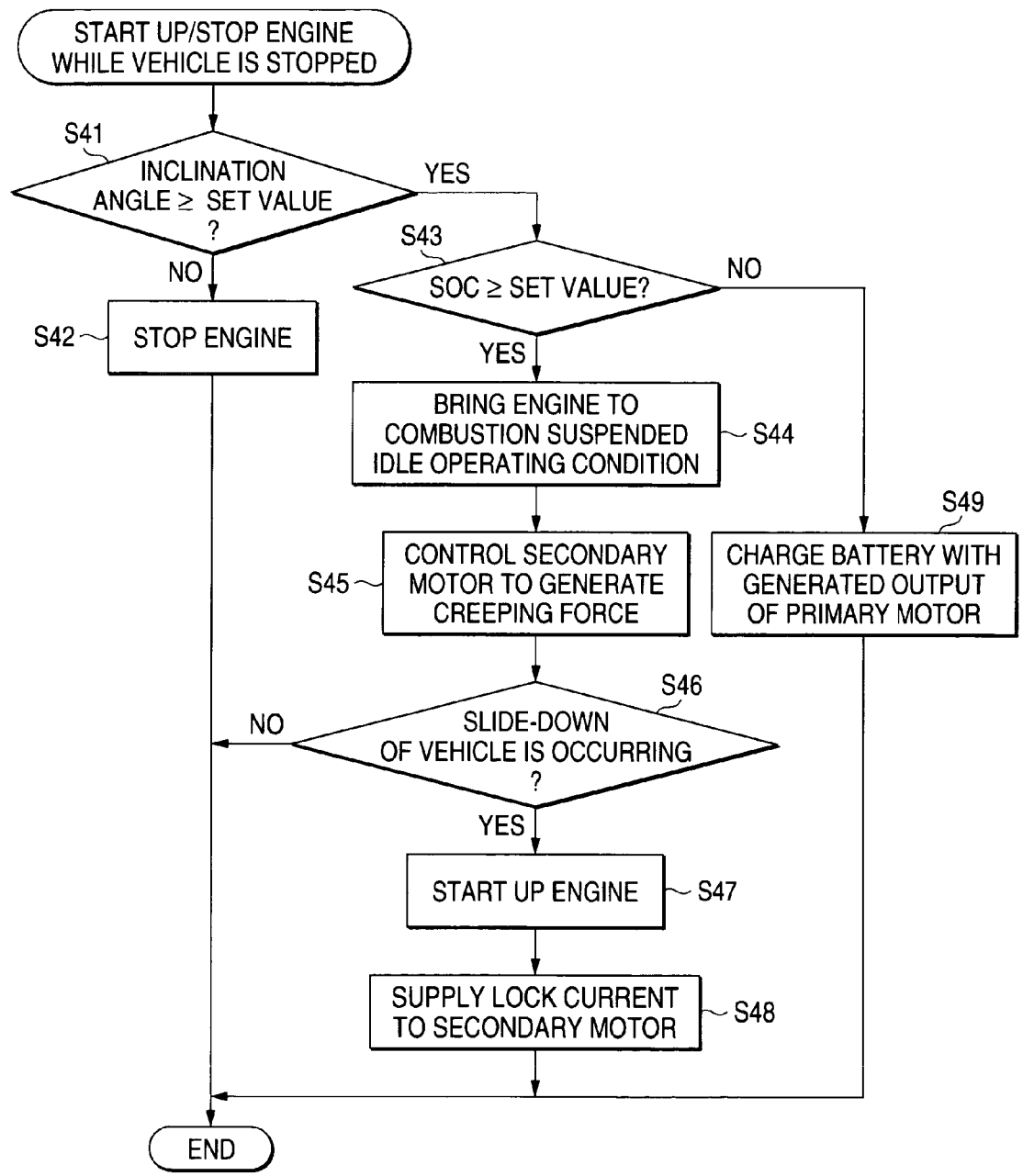
FIG. 8 is a flowchart showing an engine start-up/stop routine when the vehicle is stopped.
Figure 9:
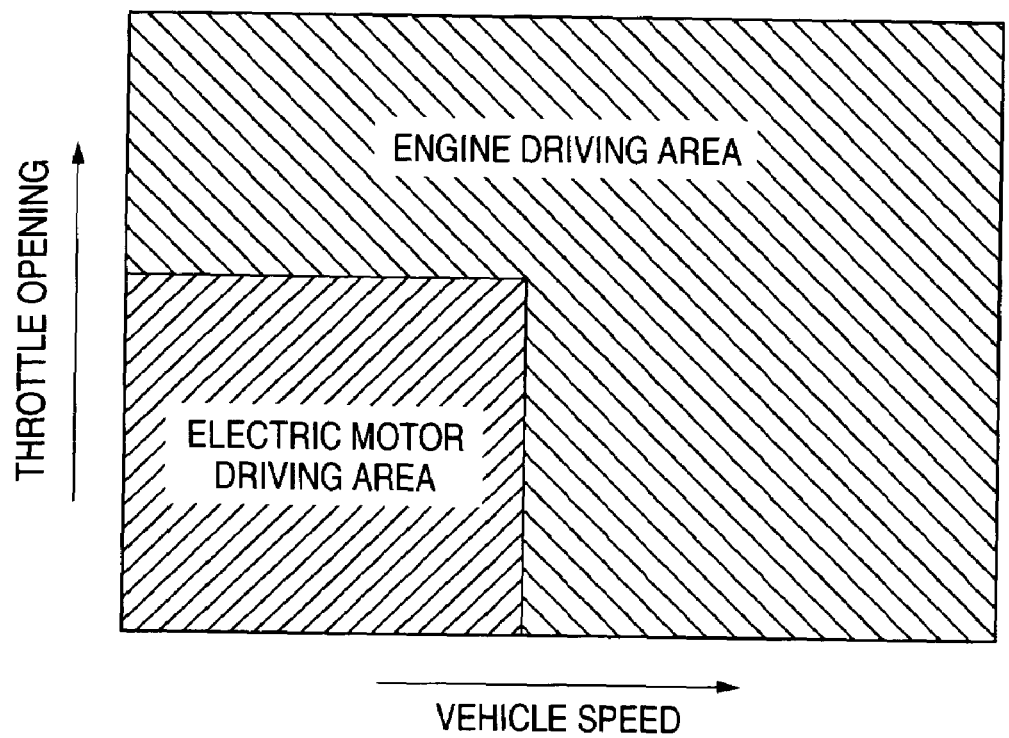
FIG. 9 is a map determining on a driving area by electric power and a driving area by the engine.

FIGS. 1 to 9 illustrate a first embodiment of the invention. FIG. 1 is a diagram showing an overall configuration of a power train of a hybrid vehicle. FIG. 2 is a block diagram showing a control system for the hybrid vehicle. FIG. 3 is a diagram explaining an example of driving condition of the hybrid vehicle. FIGS. 4A and 4B are diagrams explaining amounts of power consumed when starting up an engine. FIG. 5 is a flowchart showing a deceleration routine of the vehicle. FIG. 6 is a flowchart showing another deceleration routine of the vehicle. FIG. 7 is a flowchart showing a stop or cruising routine of the vehicle. FIG. 8 is a flowchart showing an engine start-up/stop routine when the vehicle is stopped. FIG. 9 is a map determining on a driving area by electric power and a driving area by the engine.

As shown in FIG. 1, a hybrid vehicle V includes an engine E in which combustion in all of cylinders thereof can be suspended, a transmission T, a primary motor M1 disposed in line between the engine E and the transmission T and a clutch C, and left and right front wheels Wf, Wf. The left and right front wheels Wf, Wf. are main driving wheels, and connected to the transmission T. In addition, a secondary motor M2 is connected to left and right rear wheels Wr, Wr, which are sub driving wheels. The primary and secondary motors M1, M2 are connected to a battery B and a motor electronic control unit Um. The primary and secondary motors M1, M2 are each made up of a so-called motor/generator which can function as a generator.

As shown in FIG. 2, an engine electronic control unit Ue, the motor electronic control unit Um, a battery electronic control unit Ub and a forward/reward acceleration sensor Sg are connected to a management electronic control unit U.

A throttle opening signal and a vehicle speed signal are inputted into the engine electronic control unit Ue from a throttle opening sensor St and a vehicle speed sensor Sv, respectively. An engine start-up permission signal and an engine output command signal are also inputted into the engine electronic control unit Ue from the management electronic control unit U. In addition, the engine electronic control unit Ue outputs various signals indicating operating conditions of the engine E to the management electronic control unit U.

Inputted into the motor electronic control unit Um are a temperature signal and a fail signal from a primary inverter I1 for controlling the operation of the primary motor M1, a temperature signal and a fail signal from an inverter I2 for controlling the operation of the secondary motor M2, a rotational position signal from a rotational position sensor Sr1 connected to the primary motor M1, a rotational position sensor from a rotational position sensor Sr2 connected to the secondary motor M2, and motor torque/output command signals from the management electronic control unit U. In addition, the motor electronic control unit Um outputs various signals indicating operating conditions of the primary and secondary motors M1, M2 to the management electronic control unit U and also outputs a drive signal to the inverters I1, I2.

Inputted into the battery electronic control unit Ub, are a voltage signal, a current signal and a temperature signal are inputted from the battery B connected to the primary and secondary motors M1, M2 via the inverters I1, I2, respectively. There battery electronic control unit Ub outputs a battery residual capacity signal to the management electronic control unit U.

Incidentally, inlet valves of the engine E are controlled to be opened and closed by interlocking with the rotation of a crankshaft when the engine E is normally run. In this embodiment, the inlet valves are held closed so as to reduce the pumping loss of the engine while the engine is run idly with its combustion within cylinders thereof being suspended during which the control of fuel injection and ignition into the engine E is suspended. Consequently, the consumed power of the primary motor M1 can be saved by reducing to a minimum level a load at which the engine E is rotated by the primary motor M1 while the engine E is run idly with its combustion within the cylinders thereof being suspended. In this specification, a condition in which the engine E which is being suspended from combustion is rotated by the primary motor M1 is referred to as a combustion suspended idle operating condition.

Next, referring to FIG. 3, operating conditions of the primary and secondary motors M1, M2 when the vehicle V is started up from rest and is then accelerated after it has been stopped from a decelerated condition will schematically be described below.

When the vehicle V is decelerated, with the control of fuel supply and ignition to the engine E being suspended, driving forces of the front wheels Wf, Wf are reversly transmitted to the primary motor M1 for regenerative braking, and driving forces of the rear wheels Wr, Wr are reversely transmitted to the secondary motor M2 for regenerative braking. Therefore, kinetic energy of the vehicle V is reclaimed to be stored as electric energy for charging the battery. Immediately before the vehicle V stops, the primary motor M1 is driven with the clutch being disengaged so as to rotate the engine E from the outside to bring the engine E to a combustion suspended idle operating condition. At the same time, not only an oil pressure is generated in an oil pump (not shown) provided within the engine E so as to maintain the inlet valves closed but also the engine rotational speed at which the friction of the engine E in the combustion suspended idle operating condition becomes minimum is maintained.

The vehicle is started to move by driving the rear wheels Wr, Wr by the secondary motor M2. In the event that the engine is permitted to be started up based on the throttle opening and the vehicle speed, the control of fuel supply and ignition is resumed, and the engine E is started up. As this occurs, since the engine is in the combustion suspended idle operating condition by the primary motor M1, the engine E can quickly be started up by resuming the control of fuel supply and injection and increasing the driving force of the primary motor slightly. Thus, when the engine E is started up, the front wheels Wf, Wf are driven by the driving forces of the engine E and the primary motor M1 by engaging the clutch C, and the rear wheels Wr, Wr are driven by the driving force of the secondary motor M2, whereby the vehicle V is accelerated.

Note that the cruising of the vehicle is implemented by driving the rear wheels Wr, Wr by the secondary motor M2, and as this occurs, the engine E is maintained in the combustion suspended idle operating condition by the primary motor M1.

As shown in FIG. 4A, assuming that the primary motor M1 and the engine E are stopped while the vehicle is being driven by the secondary motor M2, the consumed power of the battery B when the engine E is started up becomes a sum of the consumed power of the secondary motor M2 which is required for driving the vehicle and the consumed power of the primary motor M1 which is required for starting (cranking) up the engine E. On the other hand, as shown in FIG. 4B which illustrates the consumed power of the battery B according to the embodiment of the invention, with the engine being run by the primary motor M1 to be maintained in the combustion suspended idle operating condition, the engine E can be started up only by increasing slightly the output of the primary motor M1, thereby making it possible to save the total amount of power required for starting up the engine E. Moreover, the fuel consumption can be reduced, when compared with a case where the engine E is kept idling in preparation for starting up the engine E while the vehicle is being driven by the secondary motor M2.

Next, a function when the vehicle is decelerated will be described based on the flowchart shown in FIG. 5.

Firstly, if it is determined in step S1 that the vehicle speed is equal to or larger than a specified value, the regeneration control of the primary and secondary motors M1, M2 is allowed to continue in step S2. In case it is determined in step S1 that the vehicle speed is less than the specified value, if it is determined in step S3 that the engine E is not in the combustion suspended condition (a condition where the control of fuel supply and injection is simply suspended), and if it is determined in step S4 that the combustion of the engine E can be suspended, then, in step S5, the control of fuel supply and injection is suspended so as to bring the engine E to the combustion suspended condition.

With the engine E being in the combustion suspended condition, if it is determined in step S6 that the rotational speed of the engine is not equal to or less than a specified value, then, in step S7, the regenerating control is implemented so that the rotational speed of the primary motor M1 is allowed to be lowered to a specified value. When the rotational speed of the primary motor M1 lowers to the specified value as a result, the clutch C is disengaged, in step S8, so as to cut off the connection between the primary motor M1 and the transmission T. Then, in this condition, the primary motor is driven so that the rotational speed thereof becomes the specified value in step S9, whereby with the fuel supply thereto being cut off and the inlet valves being kept closed, the engine E is brought to the combustion suspended idle operating condition by the primary motor M1.

On the other hand, if it is determined in step S6 that the rotational speed of the engine is equal to or less than the specified value, the clutch C is disengaged so as to cut off the connection between the primary motor M1 and the transmission T in step S10, and by driving the primary motor M1 so that the rotational speed thereof becomes the specified value in step S11, the engine E to which the fuel supply is being cut off and whose inlet valves are being kept closed is brought to the combustion suspended idle operating condition.

The specified value for the engine rotational speed is an engine rotational speed at which the friction of the engine E which is in the combustion suspended idle operating condition becomes minimum.

Next, another function when the vehicle V is decelerated will be described based on the flowchart shown in FIG. 6. In the flowcharts in FIGS. 5 and 6, steps S1 to S5, S8 and S10 are identical, and steps S6, S7, S9 and S1 of the flowchart in FIG. 5 correspond to steps S6', S7', S9' and S11' of the flowchart in FIG. 6.

In the flowchart in FIG. 5, when the rotational speed of the engine becomes equal to or less than the specified value in conjunction with the deceleration of the vehicle V, the primary motor M1 is driven so that the engine E is brought to the combustion suspended idle operating condition in which the engine E is run at the rotational speed at which the friction of the engine E becomes minimum. Thus, the engine E can be started up as soon as the control of fuel supply and injection is resumed, while the power consumption of the primary motor M1 is reduced to a minimum level. In contrast, in the flowchart in FIG. 6, when the oil pressure generated by the engine E becomes equal to or less than a specified value in conjunction with the deceleration of the vehicle V, the primary motor M1 is driven so as to bring the engine E to the combustion suspended idle operating condition. Therefore, an oil pressure can be generated which is required to bring the inlet valves to the closed condition so as to reduce the pumping loss in the combustion suspended idle operating condition, while reducing the power consumption of the primary motor M1 to the minimum level.

Note that in case the specified value for the engine rotational speed that is determined in the flowchart in FIG. 5 differs from the engine rotational speed determined in the flowchart in FIG. 6 at which the engine oil pressure becomes the specified value, the rotational speed of the primary motor M1 is controlled so as to realize the higher engine rotational speed.

Next, a function when the vehicle V is stopped or cruised will be described based on the flowchart shown in FIG. 7.

Firstly, if it is determined in step S21 that the engine rotational speed is 0, the engine E is allowed to continue to stop idling in step S22. On the contrary, if it is determined in step S21 that the engine rotational speed is not 0, and if it is determined in step S23 that the engine E is not in the combustion suspended idle operating condition, then, either of a driving by the engine or a driving by the electric motor is selected by the map shown in FIG. 9 in step S24. Namely, the rear wheels Wr, Wr are driven by the secondary motor M2 so as to make the vehicle V cruise in an area where the vehicle speed is slow and the throttle opening is small, whereas the front wheels Wf, Wf are driven by the engine E so as to make the vehicle V cruise in an area where the vehicle speed is fast and the throttle opening is large.

If it is determined in the step S23 that the engine E is in the combustion suspended idle operating condition, and if it is determined in step S25 that the rotational speed of the primary motor M1 does not coincide with the specified value (refer to the flowchart in FIG. 5), then, the primary motor M1 is controlled so that the rotational speed thereof becomes the specified value in step S26. If it is determined in the step S25 that the rotational speed of the primary motor M1 coincides with the specified value (refer to the flowchart in FIG. 5), if it is determined in step S27 that the acceleration of the vehicle V is required, and if it is determined in step S28 that the throttle opening and the vehicle speed are in the electric motor driving area on the map shown in FIG. 9, the rear wheels Wr, Wr are driven by the secondary motor M2 in step S29. On the contrary, if it is determined in the step S28 that the throttle opening and the engine speed fall in the engine driving area, not the electric motor driving area, while the vehicle V is run by the secondary motor M2 in step S30, the engine E, which is in the combustion suspended idle operating condition, is started up in step S31, and the front wheels Wf, Wf are driven by the engine E based on the map in FIG. 9 to run the vehicle in step S32.

Next, a function of starting up and stopping the engine E while the vehicle V is stopped will be described further based on the flowchart shown in FIG. 8.

Firstly, if it is determined in step S41 that the inclination of a road surface is not equal to or larger than a set value and hence that there is no risk that the vehicle V slides downwardly, then, the engine E is maintained in the stopped condition in step S42. On the contrary, if it is determined in the step S41 that the inclination angle of the road surface is equal to or larger than the set value, and if it is determined in step S43 that the residual capacity of the battery B is equal to or larger than a set value, then, the motor M1 is driven to bring the engine E to the combustion suspended idle operating condition in step S44, and the secondary motor M2 is driven so as to generate a creeping force resisting against the mass of the vehicle which would be slide downwardly along the inclined road surface in step S45, thereby making it possible to prevent the vehicle from sliding downwardly due to the inclination of the road surface.

If it is determined in step S46 that the vehicle V continues to slide downwardly irrespective of the generation of such a creeping force, the engine E, which is being in the combustion suspended idle operating condition, is started up so as to generate a creeping force which can deal with the downward slide of the vehicle V in step S47, and a lock current is supplied to the secondary motor M2 so as to generate a braking force in step S48, whereby the prevention of the downward slide of the vehicle can be ensured.

On the other hand, if it is determined in the step S43 that the residual capacity of the battery B is not equal to or larger than the set value, the primary motor M1 is driven by the engine E so as to make the primary motor M1 to function as a generator in step S49, whereby the residual capacity of the battery B is restored to a level equal to or larger than the set value by the generated output of the primary motor M1, and the secondary motor M2 is driven to prevent the vehicle V from sliding downwardly. As this occurs, by running the engine E at a most efficient engine rotational speed, the fuel consumption can be reduced to the minimum level.

Figure 10:
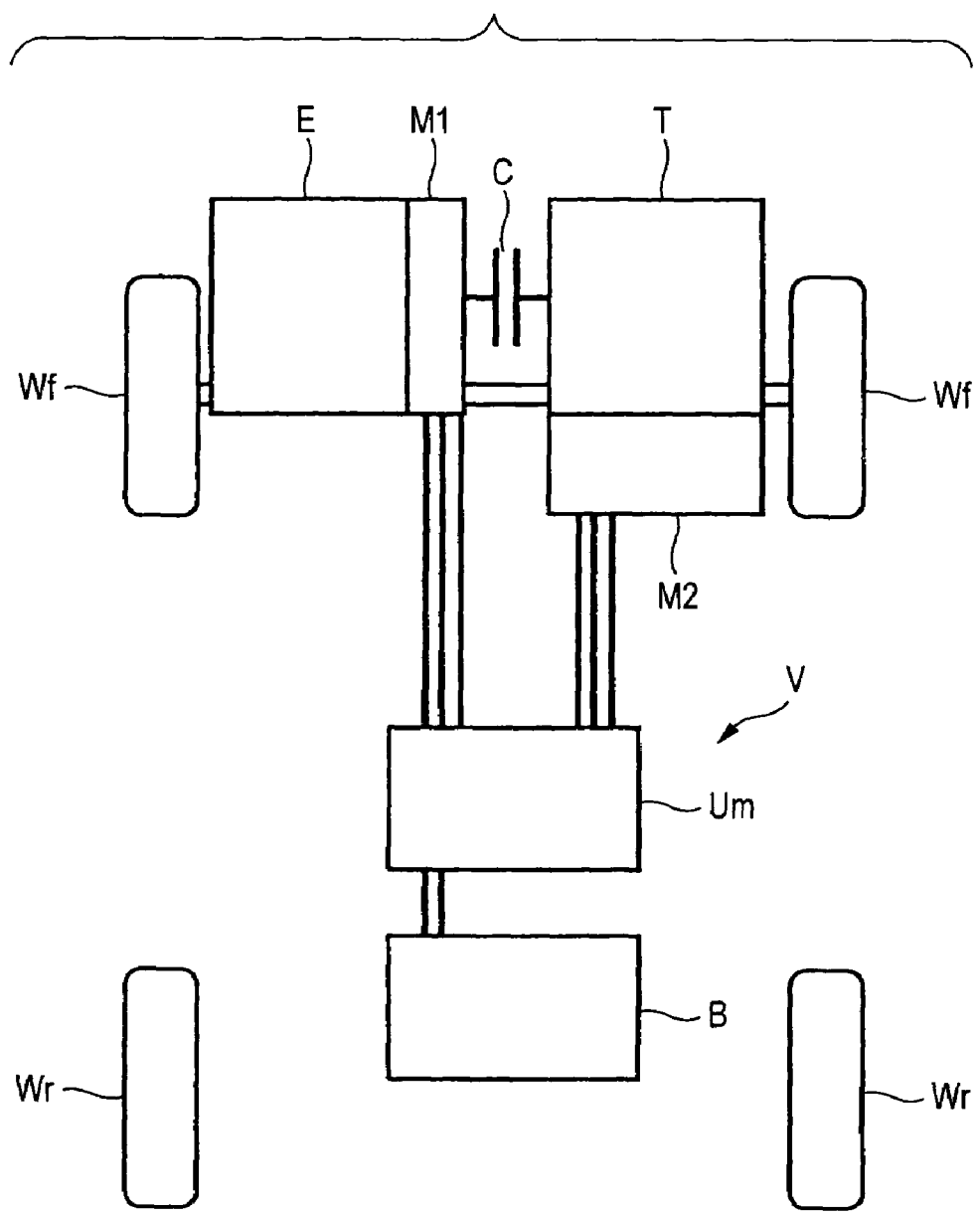
FIG. 10 is a diagram showing an overall configuration of a power train of a hybrid vehicle according to a second embodiment.

Next, a second embodiment of the invention will be described based on FIG. 10.

While the rear wheels Wr, Wr are driven by the second motor M2 in the first embodiment, a second motor M2 is disposed on an output side of the transmission T or between the transmission T and the front wheels Wf, Wf in the second embodiment. According to the second embodiment, similar to the first embodiment described earlier, the vehicle V can be run by driving the front wheels Wf, Wf by the second motor M2 while the engine E is maintained in the combustion suspended idle operating condition by the primary motor M1.

Thus, while the embodiments of the invention have been described heretofore, the invention can be modified in various ways with respect to designs without departing from the spirit and scope thereof.

For example, while the inlet valves are held closed during the combustion suspended idle operating condition in the embodiments, both the inlet valves and the exhaust valves or only the exhaust valves may be held closed.

Thus, according to the first aspect of the invention, the engine, which can be suspended from combustion, is connected to the primary driving wheels via the primary motor and the transmission, and the secondary motor is connected to the secondary driving wheels. Therefore, when the vehicle is in a predetermined driving condition, the vehicle can be driven by the secondary motor while allowing the primary motor to perform the combustion suspended idle operation, the necessity for the idle operation of the engine is obviated so as to reduce the amount of consumed fuel. In addition, the engine can be started up quickly and securely with a minimum consumed power by resuming the control of fuel supply and ignition relative to the engine and driving the primary motor while reducing the load of the primary motor during the combustion suspended idle operation of the engine so as to reduce the consumed power to a minimum level.

According to the second aspect of the invention, since the secondary motor is provided between the transmission and the primary driving wheels in place of the secondary motor for driving the secondary driving wheels, similar to the case where the secondary driving wheels are driven by the secondary motor, the vehicle can be driven by driving the primary driving wheels by the secondary motor while allowing the primary motor to keep the engine in the combustion suspended idle operating condition.

According to the third aspect of the invention, the rotational speed of the primary motor which is performing the combustion suspended idle operation is maintained at the rotational speed which can provide minimum friction on the engine. Therefore, the consumed power of the primary motor performing the combustion suspended idle operation can be reduced to a minimum level.

According to the fourth aspect of the invention, the rotational speed of the primary motor which is performing the combustion suspended idle operation is maintained at the rotational speed at which the engine can generate the predetermined oil pressure. Therefore, the need for providing a separate electric oil pump is obviated to thereby prevent an increase in the number of components involved.

According to the fifth aspect of the invention, at least either the inlet valves or the exhaust valves are held closed during the combustion suspended idle operation. Therefore, the pumping loss of the engine can be reduced to thereby reduce the power consumption of the primary motor further.

According to the sixth aspect of the invention, whether or not the engine is started up from the combustion suspended idle operating condition is determined based on the inclination angle of the road surface and the residual capacity of the electricity storage unit. Therefore, a risk that the engine cannot be started up due to the shortage of residual capacity of the electricity storage unit can be avoided while preventing the reverse of the vehicle due to the inclined road surface.

According to the seventh aspect of the invention, the engine is started up when the inclination angle of a road surface is equal to or larger than a first set value and the residual capacity of the electricity storage unit is less than a second set value. Therefore, the primary motor is driven by driving force of the engine as a generator, and the secondary motor is driven by power so generated by the primary motor or the generator so as to drive the vehicle, the electricity storage unit can be charged before the engine cannot be started up due to the shortage of residual capacity of the electricity storage unit, and the secondary motor can be driven by the generated output of the engine to thereby prevent the reverse of the vehicle.

According to the eighth aspect of the invention, the engine is idly run with its combustion being suspended when the inclination angle of a road surface is equal to or larger than the first set value and the residual capacity of the electricity storage unit is equal to or larger than the second set value. Therefore, the secondary motor is driven to generate a creeping force to prevent the reverse of the vehicle, the reverse of the vehicle can be prevented by the creeping force generated by the secondary motor while maintaining the engine in a condition in which the engine can be started up at once.

According to the ninth aspect of the invention, the engine is started up when the reverse of the vehicle cannot be prevented by the creeping force generated by the secondary motor, the lock current for preventing the reverse of the vehicle being supplied to the secondary motor. Therefore, the reverse of the vehicle can be prevented securely even when the inclination angle of the road surface is steep.

What is claimed is:

1. A hybrid vehicle comprising:
   an engine for driving primary driving wheels via a transmission, the engine being able to be suspended from combustion;
   a primary motor disposed between the engine and the transmission;
   a secondary motor for driving one of the primary driving wheels and secondary driving wheels which are different from the primary driving wheels; and
   an electricity storage unit connected to the primary and secondary motors,
   wherein the vehicle is driven by the secondary motor while allowing the primary motor to perform a combustion suspended idle operation wherein the combustion suspended idle operation comprises
   the primary motor rotating the engine according to driving conditions of the vehicle while combustion within cylinders in the engine is suspended;
   wherein a rotational speed of the primary motor, which is performing the combustion suspended idle operation, is maintained at a rotational speed which can provide minimum friction on the engine and which can generate a predetermined oil pressure; and
   wherein at least either an inlet valve or an exhaust valve is held closed during the combustion suspended idle operation by the predetermined oil pressure.

2. A hybrid vehicle as set forth in claim 1, wherein the secondary motor is provided between the transmission and the primary driving wheels.

3. A hybrid vehicle as set forth in claim 1, wherein starting up the engine from the combustion suspended idle operation is determined based on an inclination angle of a road surface and a residual capacity of the electricity storage unit.

4. A hybrid vehicle as set forth in claim 3, wherein the engine is started up when the inclination angle of a road surface is equal to or larger than a first predetermined value and the residual capacity of the electricity storage unit is less than a second predetermined value, whereby the primary motor is driven by driving force of the engine as a generator, and the secondary motor is driven by power so generated by the primary motor so as to drive the vehicle.

5. A hybrid vehicle as set forth in claim 3, wherein the engine is rotated by the primary motor with its combustion being suspended when the inclination angle of a road surface is equal to or larger than a first predetermined value and the residual capacity of the electricity storage unit is equal to or larger than a second predetermined value, whereby the secondary motor is driven to generate a creeping force to prevent the reverse of the vehicle.

6. A hybrid vehicle as set forth in claim 5, wherein the engine is started up when the reverse of the vehicle cannot be prevented by the creeping force generated by the secondary motor, a lock current for preventing the reverse of the vehicle being supplied to the secondary motor.

* * * * *